United States Patent
Yeh et al.

(10) Patent No.: US 10,192,319 B1
(45) Date of Patent: Jan. 29, 2019

(54) SURVEILLANCE METHOD AND COMPUTING DEVICE USING THE SAME

(71) Applicant: NANNING FUGUI PRECISION INDUSTRIAL CO., LTD., Nanning (CN)

(72) Inventors: Chia-Ming Yeh, New Taipei (TW); Rui-Tang Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/661,064

(22) Filed: Jul. 27, 2017

(51) Int. Cl.
  *G06T 7/00* (2017.01)
  *G06T 7/254* (2017.01)
  *G06T 7/246* (2017.01)

(52) U.S. Cl.
  CPC .............. *G06T 7/254* (2017.01); *G06T 7/248* (2017.01); *G06T 2207/20021* (2013.01); *G06T 2207/30232* (2013.01)

(58) Field of Classification Search
  None
  See application file for complete search history.

(56) References Cited

U.S. PATENT DOCUMENTS

| | | | | |
|---|---|---|---|---|
| 8,781,217 B2* | 7/2014 | Gurman | ............. | G06K 9/00201 345/419 |
| 2005/0104960 A1* | 5/2005 | Han | .................. | G06K 9/00335 348/143 |
| 2011/0169867 A1* | 7/2011 | Kniffen | ................ | G08B 13/194 345/660 |
| 2015/0262374 A1* | 9/2015 | Huang | ...................... | G06T 7/20 382/103 |
| 2015/0279052 A1* | 10/2015 | Chen | ....................... | G06T 7/208 382/103 |

FOREIGN PATENT DOCUMENTS

WO WO 2005010820 A2 * 2/2005 ......... G06K 9/00221

* cited by examiner

*Primary Examiner* — Delomia L Gilliard
(74) *Attorney, Agent, or Firm* — ScienBiziP, P.C.

(57) ABSTRACT

A computing device is able to detect one or more motion events based on two consecutive images, such as a first image and a second image. In the detection process, the computing device assigns identifiers to difference blocks retrieved from a plurality of first blocks of the first image, then defines a scanning window and moves the scanning window on a preset route over the first image. A new identical identifier is assigned for difference blocks within a current image subarea which falls into the scanning window. After a scanning period is completed, the computing device determines the happening of a motion event according to sufficient pixel similarities found in one of new identifiers.

15 Claims, 13 Drawing Sheets

|   | 1 |   |   |   |   |   |   |
|---|---|---|---|---|---|---|---|
| 1 |   | 1 |   |   |   |   | 4 |
|   |   | 1 |   |   |   |   |   |
| 5 |   | 3 |   |   |   |   |   |
|   | 3 | 3 |   |   |   |   | 6 |

FIG. 9

|   | 1 |   |   |   |   |   |   |
|---|---|---|---|---|---|---|---|
| 1 |   | 1 |   |   |   |   | 4 |
|   |   | 1 |   |   |   |   |   |
| 1 |   | 1 |   |   |   |   |   |
|   | 1 | 1 |   |   |   |   | 6 |

FIG. 12

SURVEILLANCE METHOD AND COMPUTING DEVICE USING THE SAME

FIELD

The subject matter herein generally relates to image processing technologies, and more particularly to a surveillance method and a computing device using the same.

BACKGROUND

With the development of science and technology, motion detection technologies are used in more situations, such as home security, community security, or field birdwatching.

However, motion detection based on the traditional technology needs large amount of computation, thereby greatly increasing workload of a reference computing device. Therefore, it's necessary to provide a method for detecting a motion of a target object (e.g., human body) using fewer computation.

BRIEF DESCRIPTION OF THE DRAWINGS

Implementations of the present technology will be described, by way of example only, with reference to the attached figures, wherein:

FIG. 5 illustrates a diagram showing a distribution of difference pixels in a part of the first image of FIG. 1, wherein FIG. 5 is the state of the part of the first image of FIG. 1 after being enlarged.

FIGS. 7-10 illustrate schematic diagrams of an exemplary embodiment of processes of reassigning new identifiers in the difference blocks in the part of the first image of FIG. 5, during a scanning period of method of FIG. 3;

FIG. 12 illustrates a schematic diagram showing a distribution of new identifiers in the difference blocks in the part of the first image of FIG. 5, after the scanning period is completed in method of FIG. 3.

DETAILED DESCRIPTION

Figure 1:
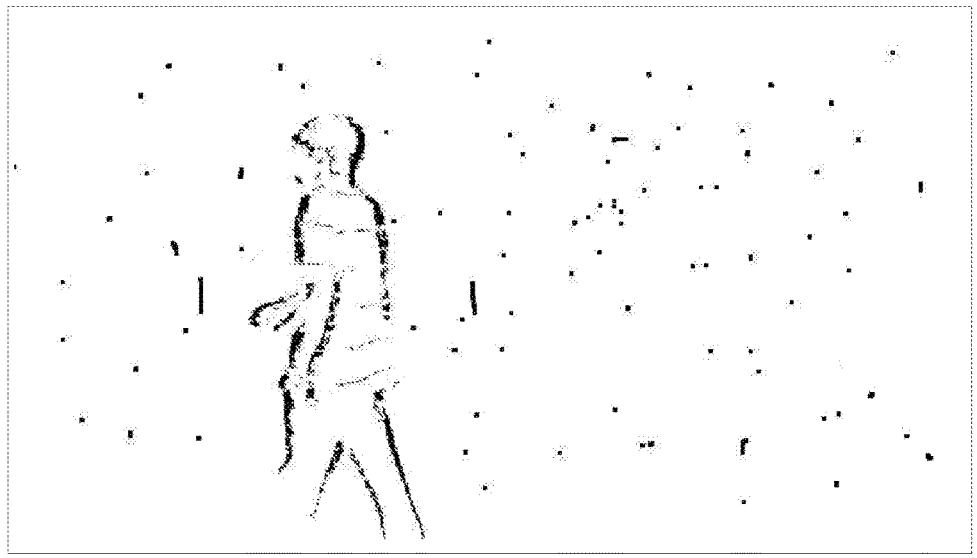
FIG. 1 illustrates a diagram showing a distribution of difference pixels in a first image.

It will be appreciated that for simplicity and clarity of illustration, where appropriate, reference numerals have been repeated among the different fingers to indicate corresponding or analogous elements. In addition, numerous specific details are set fourth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when used, means "including, but not necessarily limited to"; it specifically indicates open-ended inclusion or membership in a so-described combination, group, series, and the like.

Figure 2:
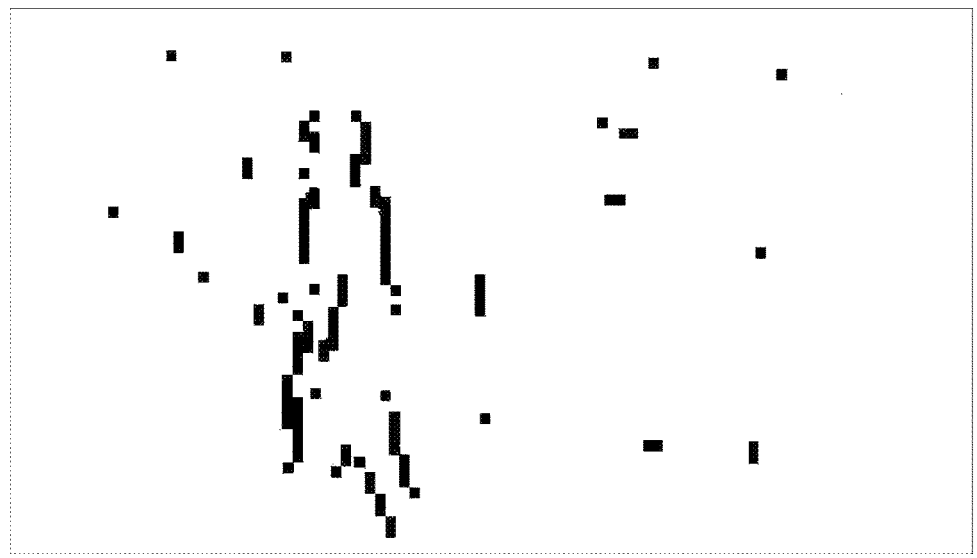
FIG. 2 illustrates a diagram showing a distribution of difference blocks in a first image.

Exemplary embodiments of a surveillance method are applied in a computing device with image processing function, such as a personal computer, a digital video camera, a digital camera, and a background device (e.g., server). In the exemplary embodiments, the computing device detects the happening of a motion event of a target object (e.g., human body), according to sufficient pixel similarities between two consecutive images (e.g., a first image and a second image). Both the first image and the second image are taken by a digital camera from one shooting position at different points in time, for example, a front frame image and a rear frame image. In the traditional technology, detecting a motion event of the target object needs a large amount of computation, a traditional computing device performs as following: comparing each pixel of the first image with a corresponding pixel of the second image to retrieve all difference pixels (black spots as shown in FIG. 1) in the first image, retrieving target pixels associating with that target object from the all difference pixels through repeatedly scanning each pixel in the first image, and finally determining whether or not a motion event of the target object is happened according to the amount of the target pixels associating with that target object. It needs a large amount of computation, because all steps is performed based on pixels. In the exemplary embodiments of present invention, the computing device can replace pixels with blocks, retrieve difference blocks (black blocks as shown in FIG. 2) by comparing the first image and the second image, retrieve target blocks associating with the target object from the difference blocks through scanning each block in the first image, and determine whether or not a motion event of the target object is happened according to the amount of the target blocks associating with the target object. If each block is consist of N pixels, the amount of computation will be dropped to 1/N, as well as in theory, compared with motion detection method based on the traditional technology. The steps of the surveillance method in the exemplary embodiments of the present invention will now be described.

Figure 3:
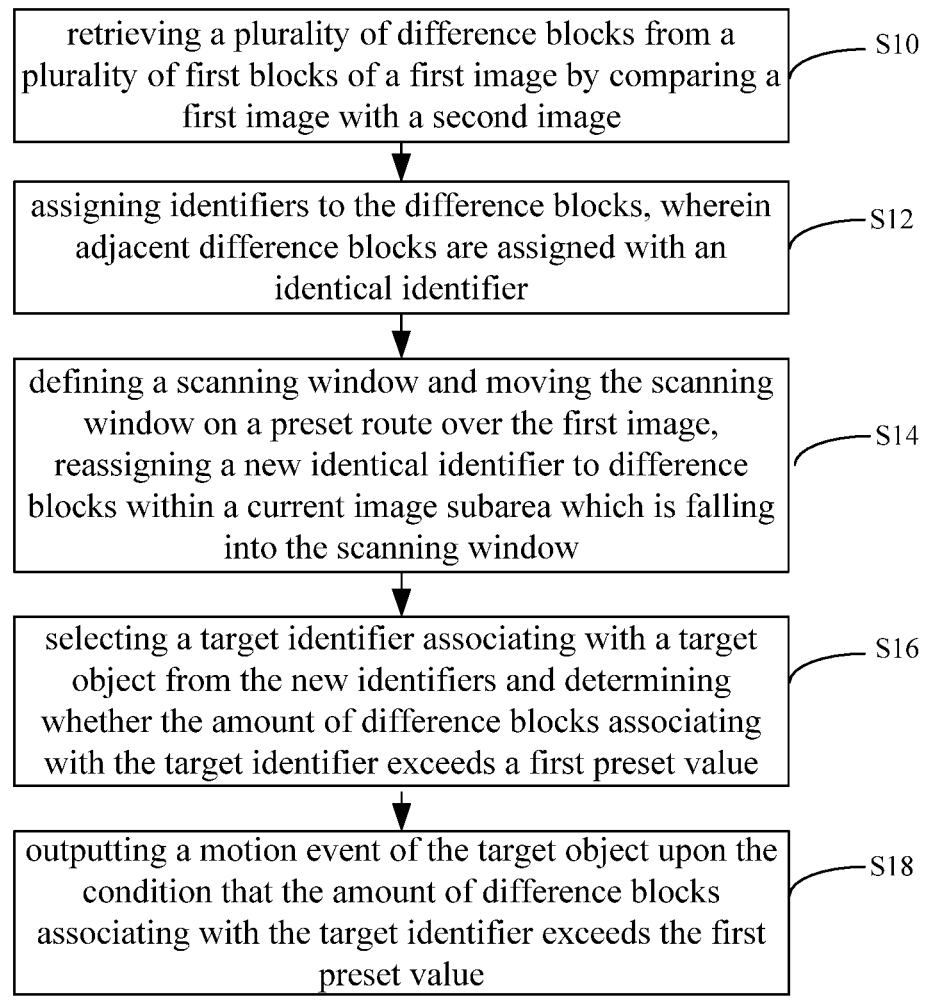
FIG. 3 illustrates a flowchart of an exemplary embodiment of a surveillance method.

FIG. 3 illustrates a flowchart of an exemplary embodiment of the surveillance method. The surveillance method is provided by way of example, as there are a variety of ways to carry out the method. Each step shown in FIG. 3 represents one or more processes, methods, or subroutines, carried out in the exemplary processing method. Additionally, the illustrated order of blocks is by example only and the order of the blocks can change. The surveillance method begins at block S10.

At block S10, the computing device retrieves a plurality of difference blocks from a plurality of first blocks of the first image by comparing the first image with the second image.

The computing device can divide the first image and the second image into the plurality of first blocks and a plurality of second blocks respectively. For example, if a resolution of the first image is 1024*768, the computing device may divide the first image into first blocks of 3*3 pixels. A 1204-th column of the first image may be divided by 1*3 pixels.

After the above division operation, the computing device calculates difference values between each of the first blocks with a corresponding second block which is located at a corresponding area in the second image, then retrieves the plurality of difference blocks according to the calculated difference values. In an exemplary embodiment, gray values serve as comparison parameters. The computing device defines one first block as one of the difference blocks when a difference between a gray value of that first block and a gray value of that second block exceeds a preset value. The above operation is repeated to retrieve all difference blocks. In another exemplary embodiment, brightness values or other values also can serve as the comparison parameters.

Figure 4:
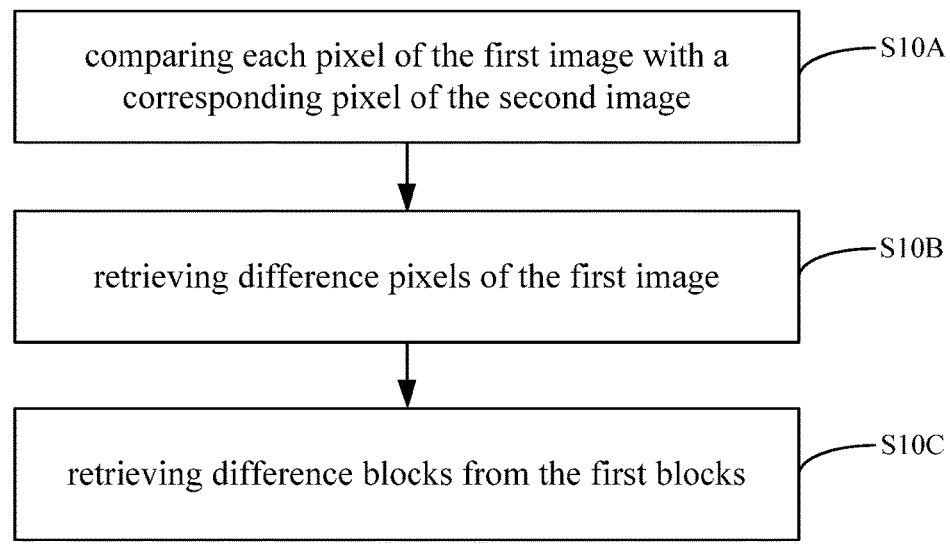
FIG. 4 illustrates a flowchart of an exemplary embodiment of step S10 in flowchart of FIG. 3.
Figure 5:
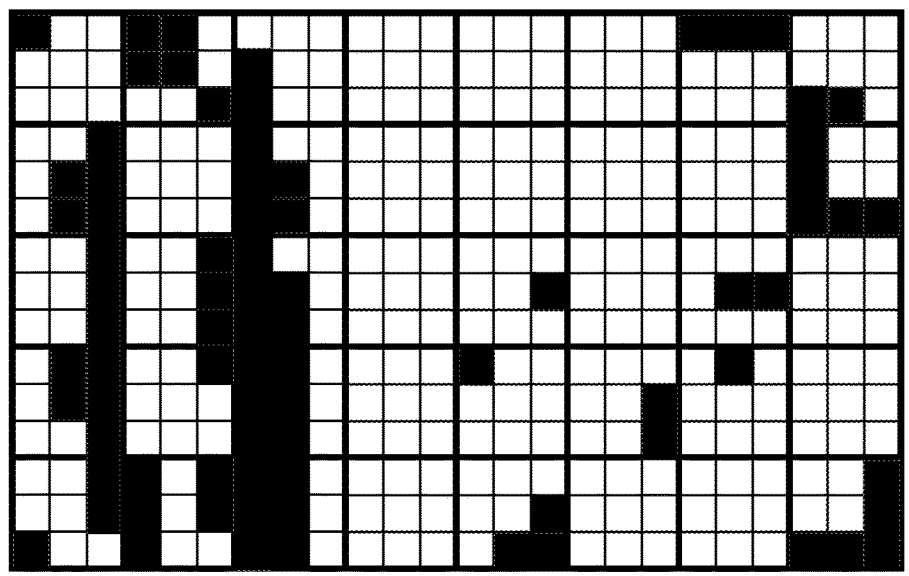

Referring to FIG. 4, the block S10 further includes blocks S10A-S10C. At block S10A, the computing device compares each pixel of the first image with a corresponding pixel of the second image. At block S10B, the computing device retrieves difference pixels (which are represented using black spots as shown in FIG. 1 and FIG. 5) of the first image, wherein a difference between each difference pixel and corresponding pixel of the second image is greater than a second preset value. At block S10C, the computing device retrieves the difference blocks from the first blocks, wherein the number of difference pixels of each difference block is greater than a third preset value.

In the further exemplary embodiment, the computing device compares a gray value of each pixel of the first image with a gray value of a corresponding pixel of the second image. One pixel of the first image is defined as a difference pixel when a difference between a gray value of that pixel and a gray value of that pixel of the second image exceeds the second preset value, all difference pixels can be retrieved in this way. Then the computing device counts the number of difference pixels in each first block, and defines as first block each block in which the number of difference pixels exceeds the third preset value as difference blocks. The second preset value and the third preset value can be preset by users. For example, if each first block is composed of X*Y pixels, the second preset value may be as X*Y/2.

At block S12, the computing device assigns identifiers to the difference blocks, wherein adjacent difference blocks are assigned with an identical identifier.

Figure 6:
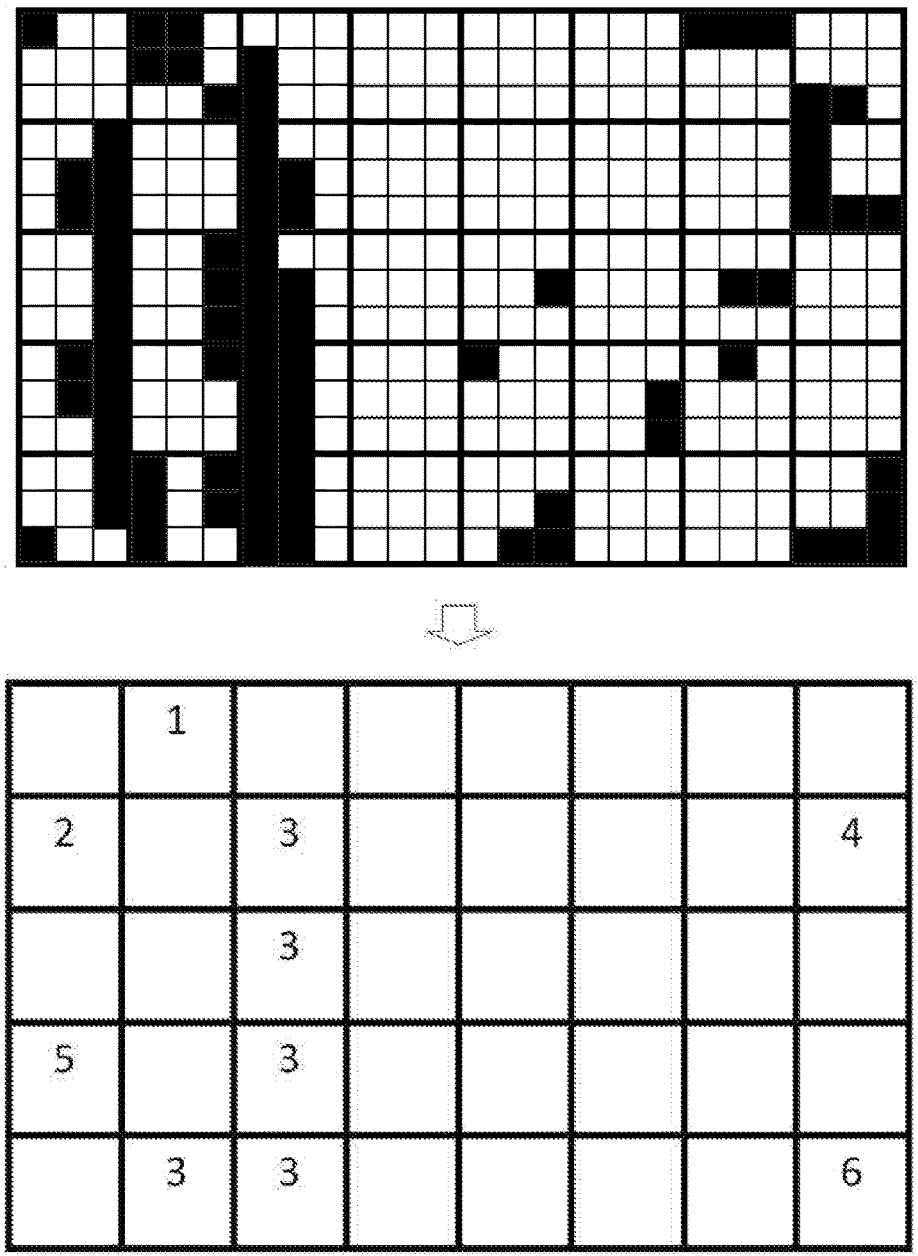
FIG. 6 illustrates a schematic diagram showing a distribution of identifiers in difference blocks in the part of the first image of FIG. 5.

Referring to FIG. 6, in the exemplary embodiment, each identifier is represented by a number, and a set of adjacent difference blocks are edge-shared. In another exemplary embodiment, each identifier also can be represented by a letter (e.g., a, b, . . . ).

Figure 7:
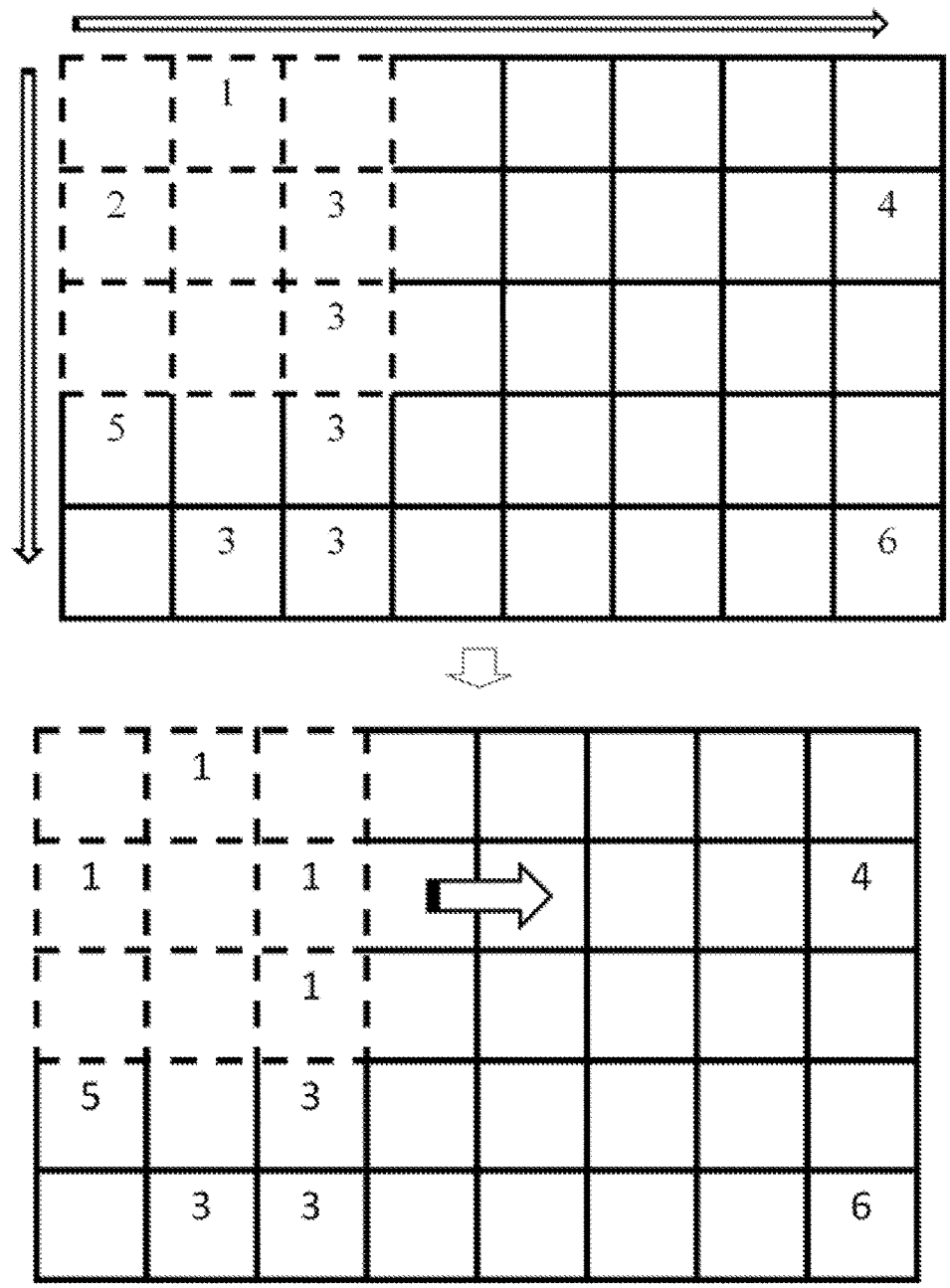

At block S14, the computing device defines a scanning window and moves the scanning window on a preset route over the first image, reassigns a new identical identifier (as shown in FIG. 7) to difference blocks within a current image subarea which falls into the scanning window. The new identical identifier is selected from current identifiers of the difference blocks within the current image subarea according a preset rule.

A size of the scanning window may be the same as a size of an image subarea composed of M*N adjacent first blocks, both M and N may be natural numbers larger than 1. Referring to FIG. 6, both M and N may be 3.

Figure 8:
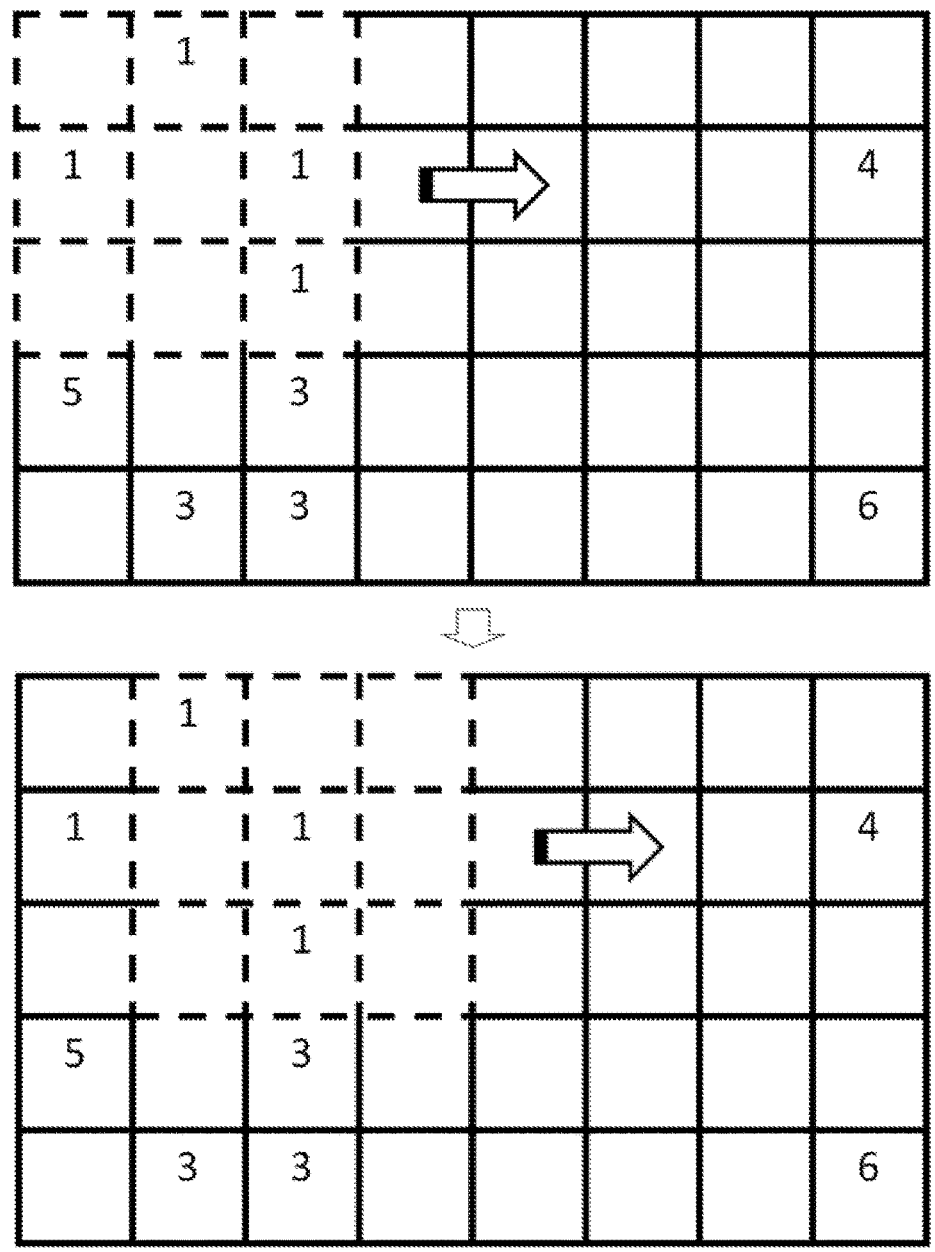
Figure 9:
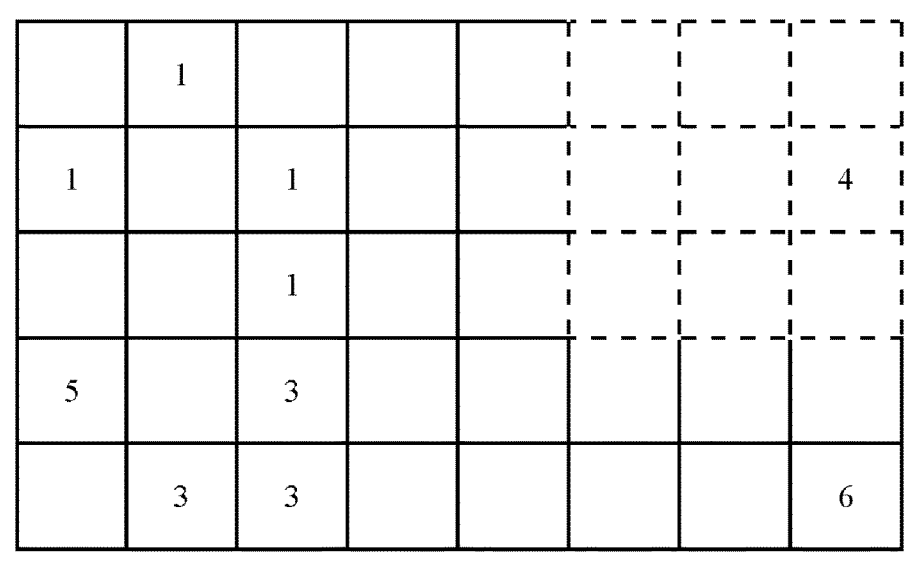
Figure 10:
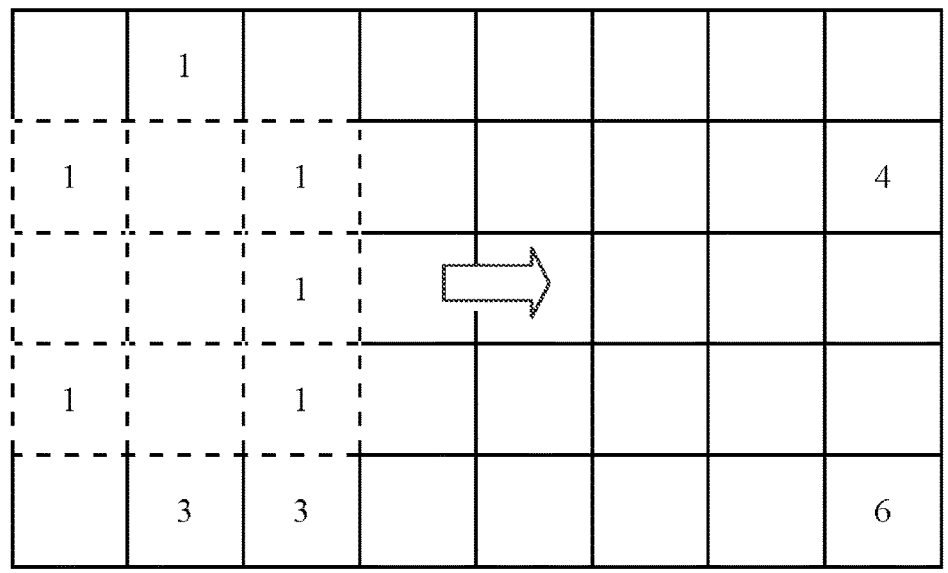

In the exemplary embodiment, the step of moving the scanning window on a preset route over the first image comprises: (A). the scanning window is moved from left to right based on a preset increment, until the scanning window touches a right edge of the first image (as shown in FIGS. 8-9). (B) the scanning window is reset on a left side edge of the first image and moved down a preset increment (as shown in FIG. 10). (A) and (B) are repeated until a scanning period is completed. The preset route starts at a upper-left corner of the first image and ends at a lower-right corner of the first image. The preset increment may be equal to a side length of one first block, or to several times a side length of one first block.

Referring to FIGS. 7-10, each time the scanning window moves an incremental distance, a corresponding image subarea (hereinafter, current image subarea) in the first image falls into the scanning window. If there is a plurality of difference blocks in the current image subarea, the computing device needs to update current identifiers of the difference blocks in the current image subarea. In the exemplary embodiment, the step of reassigning a new identical identifier to difference blocks within a current image subarea which falls into the scanning window comprises selecting the smallest one of the current identifiers of the difference blocks within the current image subarea as the new identical identifier and then reassigning the new identical identifier to the difference blocks within the current image subarea. In another exemplary embodiment, each new identifier also can be the greatest one of current identifiers in a corresponding image subarea which is falling into the scanning window, or can be a special identifier in a corresponding image subarea according to a preset selection rule.

At block S16, the computing device selects a target identifier associating with a target object from the new identifiers and determining whether the amount of difference blocks associating with the target identifier exceeds a first preset value.

In the exemplary embodiment, the first preset value may be preset according to a size of the target object or a ratio of the size of the target object to a size of the first image.

Figure 11:
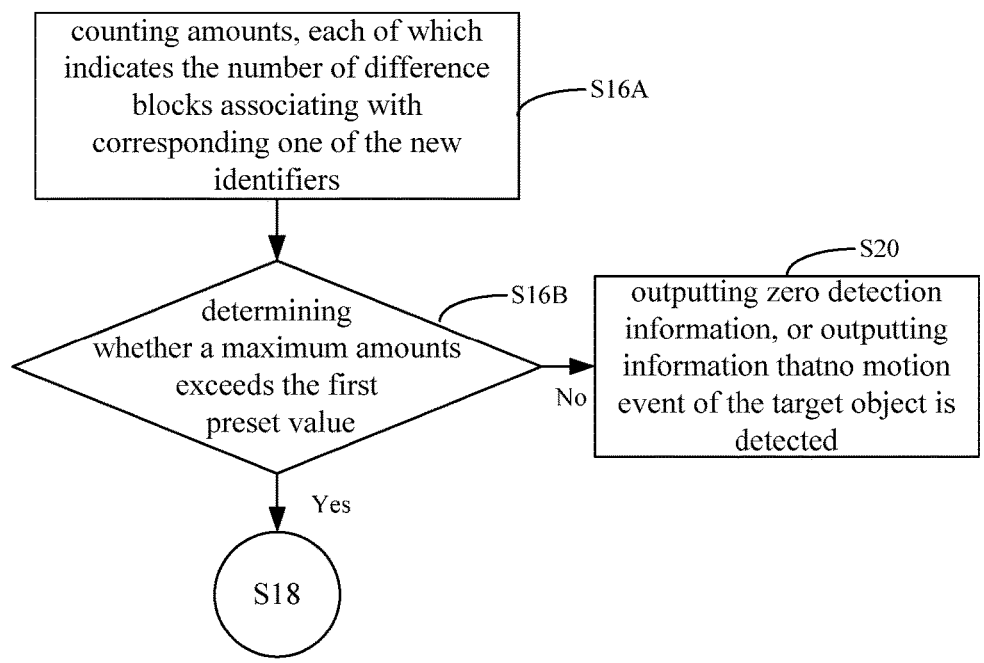
FIG. 11 illustrates a flowchart of an exemplary embodiment of step S10 of method in FIG. 3.
Figure 12:
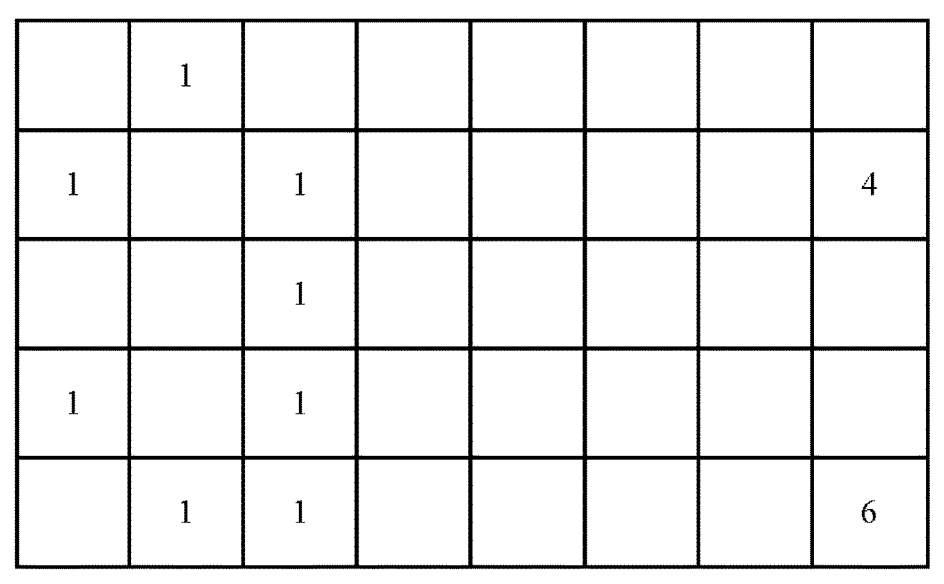

In an exemplary embodiment, referring to FIG. 11, the target identifier is associated with a maximum amount of difference blocks compared with other new identifiers. The computing device counts amounts, each of which indicates the number of difference blocks associating with one of the new identifiers (block S16A). The computing device selects one new identifier with a maximum amount as the target identifier, and determines whether the maximum amount exceeds the first preset value (block S16B). If the maximum amount of difference blocks exceeds the first preset value, the flowchart goes to block S18. If not, the flowchart goes to block S20. Referring to FIG. 12, the amount of difference blocks associating with "1" is the largest, compared to other new identifiers (e.g., 4, 6). The amount of difference blocks associating with "1" can be used as a reference for determining the happening of a motion event of the target object. The exemplary embodiment of this method is adapted to detect a larger object, for example, human body.

At block S18, the computing device outputs a motion event of the target object.

At block S20, the computing device outputs zero detection information, outputs information that no motion event of the target object is detected, or does not execute output operation.

Figure 13:
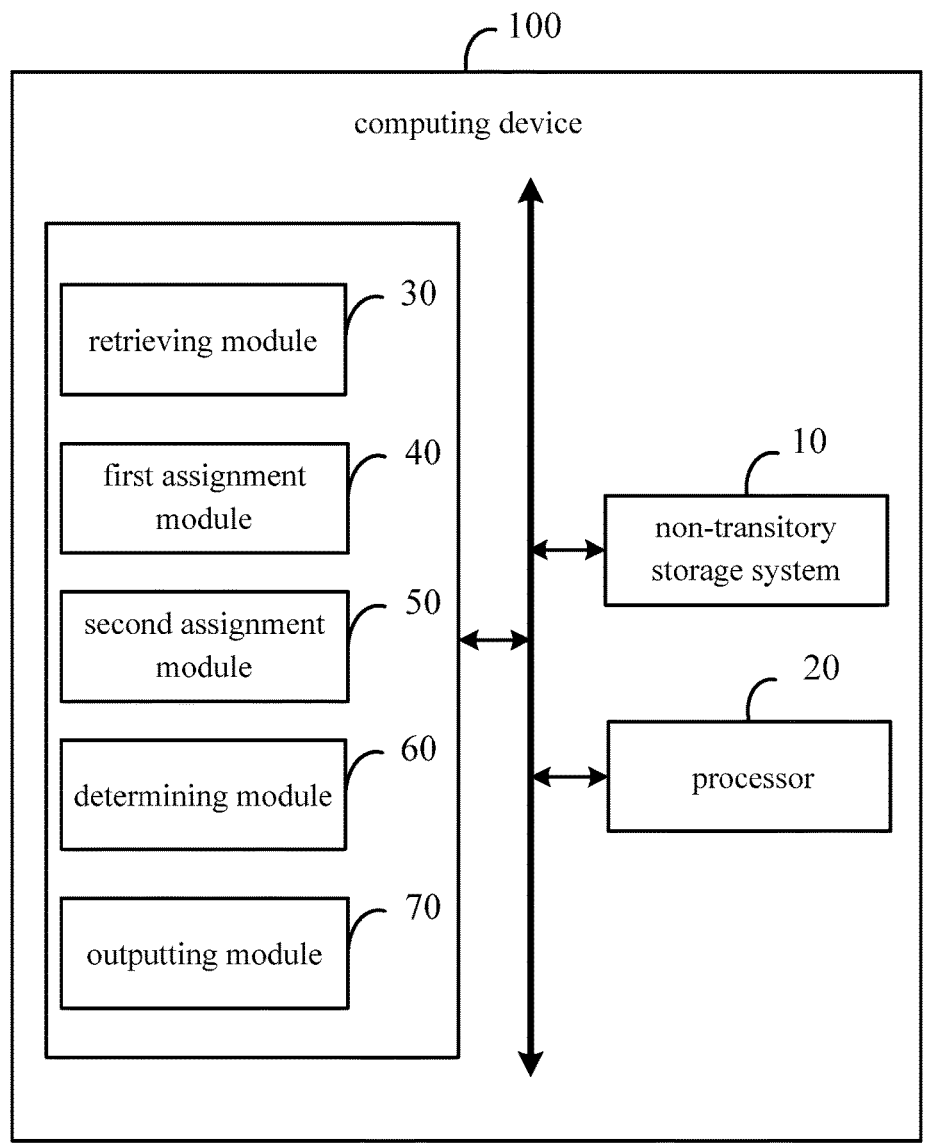
FIG. 13 illustrates an exemplary embodiment of functional modules of a computing device applying the method of FIG. 3.

FIG. 13 illustrates an exemplary embodiment of functional modules of an computing device 2. Exemplary embodiments of the computing device 2 may include a personal computer, a digital video camera, a digital camera, and a background device (e.g., server), and the like. The computing device 2 may be divided into one or more modules which are stored in a non-transitory storage medium 10. The function of each of the modules are executed by one or more processors (e.g. by the processor 20).

In the exemplary embodiment, the modules of the computing device 2 includes a retrieving module 30, a first assignment module 40, a second assignment module 50, a determining module 60, and an outputting module 70.

The retrieving module 30 retrieves a plurality of difference blocks from a plurality of first blocks of a first image by comparing the first image with a second image. In the exemplary embodiment, the retrieving module 30 compares each pixel of the first image with a corresponding pixel of the second image; then retrieves pixels of the first image as difference pixels if difference between a pixel and corresponding pixel of the second image is greater than a second preset value. The difference blocks are retrieved from the first blocks, wherein the number of difference pixels of each difference block is greater than a third preset value.

The first assignment module 40 assigns identifiers to the difference blocks, wherein adjacent difference blocks are assigned with an identical identifier.

The second assignment module 50 defines a scanning window and moves the scanning window on a preset route over the first image, and reassigns a new identical identifier (as shown in FIG. 7) to difference blocks within a current image subarea which falls into the scanning window. The new identical identifier is selected from current identifiers of the difference blocks within the current image subarea according to a preset rule.

The determining module 60 selects a target identifier associating with a target object from the new identifiers and determining whether the amount of difference blocks associating with the target identifier exceeds a first preset value. In the exemplary embodiment, the determining module 60 counts the amount of difference blocks associating with one new identifier. A determination is then made as to whether a maximum amount exceeds the first preset value.

The outputting module 70 outputs a detected motion event of the target object if the amount of difference blocks associating with the target identifier exceeds the first preset value.

It should be emphasized that the above-described exemplary embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computing device comprising:
   at least one processor;
   a non-transitory storage system coupled to the at least one processor and configured to store one or more programs to be executed by the at least one processor, the one or more programs including instructions for:
   retrieving a plurality of difference blocks from a plurality of first blocks of a first image by comparing the first image with a second image;
   assigning identifiers to the difference blocks, wherein adjacent difference blocks are assigned with an identical identifier;
   defining a scanning window and moving the scanning window on a preset route over the first image, reassigning a new identical identifier to difference blocks within a current image subarea which is falling into the scanning window, wherein the new identical identifier is selected from current identifiers of the difference blocks within the current image subarea according a preset rule;
   selecting a target identifier associating with a target object from the new identifiers and determining whether the amount of difference blocks associating with the target identifier exceeds a first preset value; and
   outputting a motion event of the target object upon the condition that the amount of difference blocks associating with the target identifier exceeds the first preset value.

2. The computing device of claim 1, the retrieving instruction further comprises:
   comparing each pixel of the first image with a corresponding pixel of the second image;
   retrieving difference pixels of the first image, wherein a difference between each difference pixel and corresponding pixel of the second image is greater than a second preset value; and
   retrieving the difference blocks from the first blocks, wherein the number of difference pixels of each difference block is greater than a third preset value.

3. The computing device of claim 1, the moving instructions further comprise:
   (A). moving the scanning window from left to right based on a preset increment, until the scanning window touches a right edge of the first image;
   (B). resetting the scanning window on a left side edge of the first image and moving the scanning window down a preset increment;
   repeating (A) and (B) until a scanning period is completed.

4. The computing device of claim 1, the reassigning instructions further comprise:
   selecting a smallest one of the current identifiers of the difference blocks within the current image subarea as the new identical identifier; and
   reassigning the new identical identifier to the difference blocks within the current image subarea.

5. The computing device of claim 1, wherein the determining instruction further comprises:
   counting amounts, each of which indicates the number of difference blocks associating with corresponding one of the new identifiers; and
   selecting one new identifier with a maximum amount as the target identifiers, and determining whether the maximum amount exceeds the first preset value.

6. A surveillance method comprising:
- retrieving a plurality of difference blocks from a plurality of first blocks of a first image by comparing the first image with a second image;
- assigning identifiers to the difference blocks, wherein adjacent difference blocks are assigned with an identical identifier;
- defining a scanning window and moving the scanning window on a preset route over the first image, reassigning a new identical identifier to difference blocks within a current image subarea which is falling into the scanning window, wherein the new identical identifier is selected from current identifiers of the difference blocks within the current image subarea according a preset rule;
- selecting a target identifier associating with a target object from the new identifiers and determining whether the amount of difference blocks associating with the target identifier exceeds a first preset value; and
- outputting a motion event of the target object upon the condition that the amount of difference blocks associating with the target identifier exceeds the first preset value.

7. The method of claim 6, the retrieving instruction further comprises:
- comparing each pixel of the first image with a corresponding pixel of the second image;
- retrieving difference pixels of the first image, wherein a difference between each difference pixel and corresponding pixel of the second image is greater than a second preset value; and
- retrieving the difference blocks from the first blocks, wherein the number of difference pixels of each difference block is greater than a third preset value.

8. The method of claim 6, the moving instructions further comprise:
- (A). moving the scanning window from left to right based on a preset increment, until the scanning window touches a right edge of the first image;
- (B), resetting the scanning window on a left side edge of the first image and moving the scanning window down a preset increment;
- repeating (A) and (B) until a scanning period is completed.

9. The method of claim 6, the reassigning instructions further comprise:
- selecting a smallest one of the current identifiers of the difference blocks within the current image subarea as the new identical identifier; and
- reassigning the new identical identifier to the difference blocks within the current image subarea.

10. The method of claim 6, wherein the determining step further comprises:
- counting amounts, each of which indicates the number of difference blocks associating with corresponding one of the new identifiers; and
- selecting one new identifier with a maximum amount as the target identifiers, and determining whether the maximum amount exceeds the first preset value.

11. A non-transitory storage medium storing executable program instructions which, when executed by a processing system, cause the processing system to perform a method comprising:
- retrieving a plurality of difference blocks from a plurality of first blocks of a first image by comparing the first image with a second image;
- assigning identifiers to the difference blocks, wherein adjacent difference blocks are assigned with an identical identifier;
- defining a scanning window and moving the scanning window on a preset route over the first image, and when the scanning window is moved to an image subarea of the first image, reassigning a new identical identifier to difference blocks within the image subarea of the first image, wherein the new identical identifier is selected from current identifiers of the difference blocks within the image subarea of the first image according a preset rule;
- selecting a target identifier associating with a target object from the new identifiers and determining whether the amount of difference blocks associating with the target identifier exceeds a first preset value; and
- outputting a motion event of the target object upon the condition that the amount of difference blocks associating with the target identifier exceeds the first preset value.

12. The medium of claim 11, the retrieving instruction further comprises:
- comparing each pixel of the first image with a corresponding pixel of the second image;
- retrieving difference pixels of the first image, wherein a difference between each difference pixel and corresponding pixel of the second image is greater than a second preset value; and
- retrieving the difference blocks from the first blocks, wherein the number of difference pixels of each difference block is greater than a third preset value.

13. The medium of claim 11, the moving instructions further comprise:
- (A). moving the scanning window from left to right based on a preset increment, until the scanning window touches a right edge of the first image;
- (B), resetting the scanning window on a left side edge of the first image and moving the scanning window down a preset increment;
- repeating (A) and (B) until a scanning period is completed.

14. The medium of claim 11, the reassigning instructions further comprise:
- selecting a smallest one of the current identifiers of the difference blocks within the current image subarea as the new identical identifier; and
- reassigning the new identical identifier to the difference blocks within the current image subarea.

15. The medium of claim 11, wherein the determining step further comprises:
- counting amounts, each of which indicates the number of difference blocks associating with corresponding one of the new identifiers; and
- selecting one new identifier with a maximum amount as the target identifiers, and determining whether the maximum amount exceeds the first preset value.

\* \* \* \* \*